US010785996B2

(12) United States Patent
Giardino et al.

(10) Patent No.: US 10,785,996 B2
(45) Date of Patent: Sep. 29, 2020

(54) APPARATUSES, SYSTEMS, AND METHODS FOR INLINE INJECTION OF GASES INTO LIQUIDS

(71) Applicant: Cornelius, Inc., Saint Paul, MN (US)

(72) Inventors: Nicholas Giardino, Gilberts, IL (US); Jacob Lukjanowicz, Lockport, IL (US); José Renteriá, Chicago, IL (US)

(73) Assignee: Cornelius, Inc., Osseo, MN (US)

( * ) Notice: Subject to any disclaimer, the term of this patent is extended or adjusted under 35 U.S.C. 154(b) by 417 days.

(21) Appl. No.: 15/226,450

(22) Filed: Aug. 2, 2016

(65) Prior Publication Data

US 2017/0055552 A1    Mar. 2, 2017

Related U.S. Application Data

(60) Provisional application No. 62/241,928, filed on Oct. 15, 2015, provisional application No. 62/211,414, (Continued)

(51) Int. Cl.
*A23L 2/54* (2006.01)
*B01F 5/04* (2006.01)
(Continued)

(52) U.S. Cl.
CPC ................. *A23L 2/54* (2013.01); *A47J 31/44* (2013.01); *B01F 3/04503* (2013.01);
(Continued)

(58) Field of Classification Search
CPC ................ B01F 5/0465; B01F 3/04503; B01F 2/04808; B01F 5/0476; B01F 2003/049;
(Continued)

(56) References Cited

U.S. PATENT DOCUMENTS 1,365,183 A    1/1921    Moffatt
1,561,036 A    11/1925   Sugden
(Continued)

FOREIGN PATENT DOCUMENTS

CA    2005959    6/1990
CN    1060073    4/1992
(Continued)

OTHER PUBLICATIONS

"Check valve" Wikipedia published Apr. 27, 2014 accessed at <https://en.wikipedia.org/w/index.php?title=Check_valve&oldid=605998354> (Year: 2014).*
(Continued)

*Primary Examiner* — Stephen Hobson
(74) *Attorney, Agent, or Firm* — Andrus Intellectual Property Law, LLP

(57) ABSTRACT

A gas injection system for injecting a gas into a liquid to form a solution includes a flow channel that conveys a liquid from an upstream inlet configured to receive the liquid and a downstream outlet configured to dispense the solution, sparger positioned in the flow channel, a solution pressure detection device configured to sense a pressure of the solution in the flow channel, and a liquid valve configured to regulate flow of the liquid in the flow channel based on the pressure sensed by the solution pressure detection device. The sparger is configured to inject the gas into the liquid through the porous surface as the liquid flows across the surface.

23 Claims, 10 Drawing Sheets

Related U.S. Application Data filed on Aug. 28, 2015, provisional application No. 62/209,701, filed on Aug. 25, 2015.

(51) Int. Cl.
  *B01F 3/04* (2006.01)
  *A47J 31/44* (2006.01)
  *A23F 5/24* (2006.01)

(52) U.S. Cl.
  CPC ........ *B01F 3/04808* (2013.01); *B01F 5/0465* (2013.01); *B01F 5/0476* (2013.01); *A23F 5/24* (2013.01); *A23V 2002/00* (2013.01); *B01F 2003/049* (2013.01); *B01F 2003/04921* (2013.01); *B01F 2215/0022* (2013.01)

(58) Field of Classification Search
  CPC .... B01F 2003/04921; B01F 2215/0022; A23L 2/54; A47J 31/44; A23F 5/24; A23V 2002/00
  See application file for complete search history.

(56) References Cited

U.S. PATENT DOCUMENTS

| | | |
|---|---|---|
| 1,960,640 A | 5/1934 | Lajeunesse |
| 2,006,313 A | 6/1935 | Geddes |
| 2,170,531 A | 8/1939 | Kahn |
| 2,209,054 A | 7/1940 | Doud et al. |
| 2,556,038 A | 6/1951 | Kollsman |
| 2,620,107 A | 12/1952 | Tolan |
| 3,113,871 A | 12/1963 | Webster |
| 3,397,871 A | 8/1968 | Hasselberg |
| 3,399,542 A * | 9/1968 | Bracken ............ F25B 41/04 62/117 |
| 3,417,974 A | 12/1968 | Glynn |
| 3,545,731 A * | 12/1970 | McManus ............ B01F 3/0446 261/122.1 |
| 3,582,351 A | 6/1971 | Austin et al. |
| 3,617,032 A | 11/1971 | Tracy |
| 3,780,198 A * | 12/1973 | Pahl et al. ............ A23L 2/54 426/477 |
| 3,911,064 A | 10/1975 | McWhirter, Jr. et al. |
| 4,124,049 A | 11/1978 | Yamaguchi |
| 4,171,580 A | 10/1979 | Vabrinskas |
| 4,181,604 A | 1/1980 | Onishi et al. |
| 4,208,903 A | 6/1980 | Hopper et al. |
| 4,251,473 A | 2/1981 | Gilbey |
| 4,259,360 A | 3/1981 | Venetucci et al. |
| 4,268,279 A | 5/1981 | Shindo et al. |
| 4,323,090 A | 4/1982 | Magi |
| 4,364,493 A | 12/1982 | Raynes et al. |
| 4,466,342 A | 8/1984 | Basile et al. |
| 4,481,986 A | 11/1984 | Meyers |
| 4,517,135 A | 5/1985 | Szerenyi et al. |
| 4,518,541 A | 5/1985 | Harris |
| 4,526,298 A | 7/1985 | Boxer et al. |
| 4,573,967 A | 3/1986 | Hargrove et al. |
| 4,583,969 A | 4/1986 | Mortensen |
| 4,610,888 A | 9/1986 | Teng et al. |
| 4,668,219 A | 5/1987 | Israel |
| 4,674,958 A | 6/1987 | Igarashi et al. |
| 4,681,244 A | 7/1987 | Geddie |
| 4,708,827 A | 11/1987 | McMillin |
| 4,709,625 A | 12/1987 | Layre et al. |
| 4,719,056 A | 1/1988 | Scott |
| 4,739,905 A | 4/1988 | Nelson |
| 4,759,474 A | 7/1988 | Regunathan et al. |
| 4,781,889 A | 11/1988 | Fukasawa et al. |
| 4,785,973 A | 11/1988 | Kobe |
| 4,808,346 A * | 2/1989 | Strenger ............ A47J 31/407 222/129.1 |
| 4,808,348 A | 2/1989 | Rudick et al. |
| 4,815,635 A | 3/1989 | Porter |
| 4,818,447 A | 4/1989 | Iwasaki |
| 4,820,269 A | 4/1989 | Riddell |
| 4,850,269 A | 7/1989 | Hancock et al. |
| 4,857,350 A | 8/1989 | Iwasaki et al. |
| 4,869,396 A | 9/1989 | Horino et al. |
| 4,897,359 A | 1/1990 | Oakley et al. |
| 4,923,379 A | 5/1990 | Tomminen |
| 4,927,335 A | 5/1990 | Pensa |
| 4,927,567 A | 5/1990 | Rudick |
| 4,940,212 A | 7/1990 | Burton |
| 4,950,431 A | 8/1990 | Rudick et al. |
| 4,959,152 A | 9/1990 | Nichols |
| 4,961,760 A | 10/1990 | Caskey et al. |
| 4,971,836 A | 11/1990 | Fukasawa et al. |
| 4,976,894 A | 12/1990 | Robinson |
| 4,999,140 A | 3/1991 | Sutherland et al. |
| 5,029,733 A | 7/1991 | Hedderick et al. |
| 5,034,164 A | 7/1991 | Semmens |
| 5,037,610 A | 8/1991 | Fukasawa et al. |
| 5,038,976 A | 8/1991 | McMillin |
| 5,044,171 A | 9/1991 | Farkas |
| 5,059,374 A | 10/1991 | Krueger et al. |
| 5,060,833 A | 10/1991 | Edison et al. |
| 5,062,548 A | 11/1991 | Hedderick et al. |
| 5,073,811 A | 12/1991 | Botti et al. |
| 5,104,158 A | 4/1992 | Meyer et al. |
| 5,118,009 A | 6/1992 | Novitsky |
| 5,124,088 A | 6/1992 | Stumphauzer |
| 5,152,419 A | 10/1992 | Yanagi |
| 5,156,871 A | 10/1992 | Goulet et al. |
| 5,192,513 A | 3/1993 | Stumphauzer et al. |
| 5,222,308 A | 6/1993 | Barker et al. |
| 5,232,601 A | 8/1993 | Chu et al. |
| 5,254,143 A | 10/1993 | Anazawa et al. |
| 5,260,081 A | 11/1993 | Stumphauzer et al. |
| 5,287,636 A | 2/1994 | Lafleur et al. |
| 5,294,338 A | 3/1994 | Kamo et al. |
| 5,299,715 A | 4/1994 | Feldman |
| 5,304,130 A | 4/1994 | Button et al. |
| 5,306,242 A | 4/1994 | Joyce et al. |
| 5,353,963 A | 10/1994 | Gorski |
| 5,358,142 A | 10/1994 | Holmes |
| 5,366,625 A | 11/1994 | Pedersen et al. |
| 5,380,433 A | 1/1995 | Etienne et al. |
| 5,419,461 A | 5/1995 | Goulet |
| 5,460,846 A | 10/1995 | Stumphauzer et al. |
| 5,509,349 A | 4/1996 | Anderson et al. |
| 5,510,194 A | 4/1996 | Hendricks et al. |
| 5,515,687 A | 5/1996 | Arriulou |
| 5,531,254 A | 7/1996 | Rosenbach |
| 5,549,037 A | 8/1996 | Stumphauzer et al. |
| 5,565,149 A | 10/1996 | Page et al. |
| 5,588,984 A | 12/1996 | Verini |
| 5,592,867 A | 1/1997 | Walsh et al. |
| 5,634,571 A | 6/1997 | Cataneo et al. |
| D384,731 S | 10/1997 | Ramacier, Jr. et al. |
| 5,674,433 A | 10/1997 | Semmens et al. |
| 5,779,897 A | 7/1998 | Kalthod et al. |
| 5,792,391 A | 8/1998 | Vogel et al. |
| 5,826,432 A | 10/1998 | Ledbetter |
| 5,882,717 A | 3/1999 | Panesar et al. |
| 5,980,959 A | 11/1999 | Fruitin |
| 6,041,970 A | 3/2000 | Vogel |
| 6,073,811 A | 6/2000 | Costea |
| 6,082,401 A | 7/2000 | Braun et al. |
| 6,092,811 A | 7/2000 | Bojarczuk et al. |
| 6,098,849 A | 8/2000 | McInnes |
| 6,138,995 A | 10/2000 | Page |
| 6,155,781 A | 12/2000 | Tsai |
| 6,167,718 B1 | 1/2001 | Halimi et al. |
| 6,209,855 B1 | 4/2001 | Glassford |
| 6,216,961 B1 | 4/2001 | Utter et al. |
| 6,235,641 B1 | 5/2001 | Christenson |
| 6,439,549 B1 | 8/2002 | Loov |
| 6,481,642 B1 | 11/2002 | Louis, Jr. et al. |
| 6,530,400 B2 | 3/2003 | Nelson |
| 6,688,019 B2 | 2/2004 | Buchweitz |
| 6,719,175 B2 | 4/2004 | Mackenzie |
| 6,749,090 B2 | 6/2004 | Bailey |
| 6,755,047 B2 | 6/2004 | Kreutzmann et al. |

(56) References Cited

U.S. PATENT DOCUMENTS

| | | |
|---|---|---|
| 6,869,081 B1 | 3/2005 | Jenco |
| 7,048,262 B2 | 5/2006 | Cheng |
| 7,073,688 B2 | 7/2006 | Choi et al. |
| 7,086,431 B2 | 8/2006 | D'Antonio et al. |
| 7,104,531 B2 | 9/2006 | Page |
| 7,114,707 B2 | 10/2006 | Rona et al. |
| 7,255,353 B2 | 8/2007 | Caplain et al. |
| 7,267,247 B1 | 9/2007 | Crunkleton, III et al. |
| 7,361,164 B2 | 4/2008 | Simpson et al. |
| 7,407,154 B2 * | 8/2008 | Sakakibara ....... B01F 15/00344 261/102 |
| 7,487,888 B1 | 2/2009 | Pierre, Jr. |
| 7,520,925 B2 | 4/2009 | Sisk et al. |
| 7,533,786 B2 | 5/2009 | Woolfson et al. |
| 7,717,294 B2 | 5/2010 | Bodemann |
| 7,784,651 B2 | 8/2010 | Batschied et al. |
| 7,806,299 B2 | 10/2010 | Wauters |
| 8,024,870 B1 | 9/2011 | Ballentine et al. |
| 8,158,001 B2 | 4/2012 | Taylor et al. |
| 8,348,245 B2 | 1/2013 | Fischer |
| 8,356,422 B1 | 1/2013 | Ballentine et al. |
| 8,438,969 B2 | 5/2013 | Gold |
| 8,544,688 B2 | 10/2013 | Ballentine |
| 8,603,805 B2 | 12/2013 | Goodwin et al. |
| 8,622,249 B1 | 1/2014 | Ballentine |
| 8,840,092 B2 | 9/2014 | Kumar et al. |
| 8,857,797 B2 | 10/2014 | Kumar et al. |
| 8,882,084 B2 | 11/2014 | Malagi et al. |
| 8,912,684 B2 | 12/2014 | Stahlkopf et al. |
| 8,997,633 B2 | 4/2015 | Bishop et al. |
| 9,107,449 B2 | 8/2015 | Njaastad et al. |
| 9,114,368 B2 | 8/2015 | Njaastad et al. |
| 9,339,056 B2 | 5/2016 | Njaastad |
| 9,346,024 B2 | 5/2016 | Page et al. |
| 9,386,782 B2 | 7/2016 | Choi et al. |
| 9,497,978 B2 | 11/2016 | Choi et al. |
| 9,623,383 B1 * | 4/2017 | Kleinrichert ........ B01F 3/04808 |
| 9,718,035 B2 | 8/2017 | Bandixen et al. |
| 9,801,405 B2 | 10/2017 | Kleinrichert |
| 10,017,373 B2 | 7/2018 | Kleinrichert |
| 10,182,587 B2 | 1/2019 | Lundberg et al. |
| 2002/0074369 A1 | 6/2002 | Forsman et al. |
| 2003/0075573 A1 | 4/2003 | Bailey |
| 2004/0045980 A1 | 3/2004 | Robins |
| 2004/0112455 A1 | 6/2004 | Nelson |
| 2004/0118942 A1 | 6/2004 | Courtney |
| 2004/0244216 A1 | 12/2004 | Poole |
| 2004/0262331 A1 | 12/2004 | Woolfson et al. |
| 2005/0001340 A1 | 1/2005 | Page |
| 2005/0251090 A1 | 11/2005 | Hoskins |
| 2006/0016511 A1 | 1/2006 | Chantalat |
| 2006/0112717 A1 | 6/2006 | Walton |
| 2006/0163140 A1 | 7/2006 | Taylor et al. |
| 2006/0270036 A1 * | 11/2006 | Goodwin ................ B01F 5/04 435/395 |
| 2007/0065555 A1 | 3/2007 | Soane et al. |
| 2007/0090135 A1 | 4/2007 | Benham |
| 2007/0158371 A1 | 7/2007 | Lupfer |
| 2007/0261263 A1 | 11/2007 | Lee |
| 2007/0278145 A1 | 12/2007 | Taylor et al. |
| 2008/0148959 A1 | 6/2008 | Bockbrader |
| 2008/0304356 A1 | 12/2008 | Zhuang |
| 2009/0236361 A1 | 9/2009 | Doelman et al. |
| 2010/0065584 A1 | 3/2010 | Berger |
| 2010/0083843 A1 | 4/2010 | Denisart et al. |
| 2010/0096040 A1 | 4/2010 | Litto |
| 2010/0133708 A1 | 6/2010 | Fischer |
| 2010/0203209 A1 | 8/2010 | Fishbein |
| 2010/0213223 A1 | 8/2010 | Ballentine |
| 2010/0218686 A1 | 8/2010 | O'Brien et al. |
| 2011/0020508 A1 | 1/2011 | Santoiemmo |
| 2011/0041543 A1 | 2/2011 | Tachibana et al. |
| 2011/0097466 A1 | 4/2011 | Vastardis |
| 2011/0113972 A1 | 5/2011 | Tatera |
| 2011/0115103 A1 | 5/2011 | Tatera |
| 2011/0180565 A1 | 7/2011 | Racino et al. |
| 2011/0226343 A1 | 9/2011 | Novak et al. |
| 2011/0300275 A1 | 12/2011 | Lackey et al. |
| 2012/0098148 A1 | 4/2012 | Koslow et al. |
| 2012/0177784 A1 * | 7/2012 | Malagi ................ A23L 2/54 426/67 |
| 2012/0292790 A1 | 11/2012 | Tatera |
| 2013/0106690 A1 | 5/2013 | Lim |
| 2013/0196031 A1 | 8/2013 | Criezis et al. |
| 2013/0270722 A1 * | 10/2013 | Phillips ................ B01F 5/0688 261/64.3 |
| 2014/0099405 A1 | 4/2014 | Boarman et al. |
| 2014/0113045 A1 | 4/2014 | Njaastad et al. |
| 2014/0220207 A1 * | 8/2014 | Page .................. B01F 3/04099 426/477 |
| 2014/0255574 A1 | 10/2014 | Njaastad et al. |
| 2014/0302212 A1 | 10/2014 | Njaastad |
| 2015/0329343 A1 * | 11/2015 | Kleinrichert .............. B67D 1/10 426/594 |
| 2016/0136590 A1 | 5/2016 | Campbell |
| 2016/0280528 A1 | 9/2016 | Kleinrichert |
| 2016/0289617 A1 | 10/2016 | Mackenzie et al. |
| 2017/0055552 A1 | 3/2017 | Giardino et al. |
| 2017/0064977 A1 | 3/2017 | Bischel |
| 2017/0164643 A1 | 6/2017 | Lundberg et al. |
| 2017/0233235 A2 | 8/2017 | Kleinrichert |
| 2017/0259219 A1 * | 9/2017 | Russell ................ B01F 5/0498 |
| 2017/0265499 A1 | 9/2017 | Hyde et al. |
| 2017/0326508 A1 | 11/2017 | Bandixen et al. |
| 2017/0367376 A1 | 12/2017 | Kleinrichert |
| 2018/0098658 A1 | 4/2018 | Angell et al. |
| 2018/0213824 A1 | 8/2018 | Schact et al. |
| 2018/0282144 A1 | 10/2018 | Kleinrichert |
| 2018/0362906 A1 | 12/2018 | Osborn |

FOREIGN PATENT DOCUMENTS

| | | |
|---|---|---|
| CN | 2134366 | 5/1993 |
| CN | 1197029 | 10/1998 |
| CN | 1326380 | 12/2001 |
| CN | 1537028 | 10/2004 |
| CN | 1856687 | 11/2006 |
| CN | 103025644 | 4/2013 |
| CN | 203123868 | 8/2013 |
| CN | 103282304 | 9/2013 |
| CN | 104039431 | 9/2014 |
| DE | 20112974 | 9/2002 |
| DE | 602004003627 | 10/2007 |
| DE | 102008012486 | 9/2009 |
| DE | 102010012175 | 9/2011 |
| EP | 0132913 | 2/1988 |
| EP | 0470377 | 2/1992 |
| EP | 0732142 | 9/1996 |
| EP | 0745329 | 12/1996 |
| EP | 0873966 | 10/1998 |
| EP | 1092674 | 4/2001 |
| EP | 1480906 | 12/2004 |
| EP | 1480908 | 12/2004 |
| EP | 1662218 | 5/2006 |
| EP | 2070587 | 6/2009 |
| EP | 2719450 | 4/2014 |
| EP | 2571803 | 3/2017 |
| FR | 2684088 | 5/1993 |
| GB | 694918 * | 7/1953 |
| GB | 2247225 | 2/1992 |
| GB | 2333282 | 7/1999 |
| GB | 2340415 | 2/2000 |
| GB | 2358145 | 7/2001 |
| GB | 2496010 | 5/2013 |
| GB | 2526735 | 2/2015 |
| KR | 20140035878 | 3/2014 |
| TW | 201446197 | 12/2014 |
| WO | 9529130 | 11/1995 |
| WO | 199529130 | 11/1995 |
| WO | 0187472 | 11/2001 |
| WO | 2003066509 | 8/2003 |
| WO | 2009026541 | 2/2009 |
| WO | 2009077681 | 6/2009 |

(56) References Cited

FOREIGN PATENT DOCUMENTS

| WO | 2009077682 | 6/2009 |
|----|------------|--------|
| WO | 2011134928 | 11/2011 |
| WO | 2012100333 | 8/2012 |
| WO | 2012162762 | 12/2012 |
| WO | 2014138667 | 9/2014 |
| WO | 2014183185 | 11/2014 |
| WO | 2015061564 | 4/2015 |
| WO | 2015075020 | 5/2015 |
| WO | 2015119204 | 8/2015 |
| WO | 2015124590 | 8/2015 |
| WO | 2015175244 | 11/2015 |
| WO | 2018023713 | 2/2018 |
| WO | 2018185581 | 10/2018 |

OTHER PUBLICATIONS http://mottcorp.com/sites/default/files/sparger_design_guide.pdf.
Rubesin, MW et al., The Effect of Fluid Injection on the Compressible Turbulent Boundary Layer: Preliminary Tests on Transpiration Cooling of a Flat Plate at M=2.7 with Air as the Injected Gas, National Advisory Committee for Aeronautics, 1995.
International Search Report and Written Opinion PCT/US2016/048119 dated Nov. 16, 2016.
GB Examination Report, GB Application No. 1506574.1, dated Mar. 1, 2017.
International Preliminary Report on Patentability, PCT/US2013/065763, dated Sep. 25, 2014.
International Preliminary Report on Patentability, PCT/US2014/022048, dated Feb. 18, 2015.
International Preliminary Report of Patentability, PCT/US2014/033040, dated Oct. 15, 2015.
Fulcher How to Use the Soda Stream Jet YouTube Feb. 11, 2012 [retrieved on Feb. 26, 2014] Retrieved from the Internet: <URL:http:www.youtube.com/watch?v=bf9MVEel5XM> entire video, (8 pages).
ISR and Written Opinion PCT/US2013/065763 dated Mar. 18, 2014.
ISR and Written Opinion PCT/US2014/022048 dated Jun. 27, 2014.
ISR and Written Opinion PCT/US2014/033040 dated Aug. 27, 2014.
ISR and Written Opinion, PCT/US2014/040509, dated Oct. 1, 2014.
International Search Report and Written Opinion, PCT/US2017/014665, dated Jun. 6, 2017.
International Search Report and Written Opinion, PCT/US2017/029052, dated Aug. 21, 2017.
Kycon, Inc., KLDPX-0207-x-DC Power Jack, Panel Mount drawing, Jan. 18, 2008.
Mabuchi Motor Co. Ltd., RS-38551-I-Motor Mounting drawing.
Perlini Carbonated Cocktail System YouTube video [online] Perlage Systems Jan. 11, 2010 [retrieved on Mar. 11, 2014] Retrieved from the Internet: <URL:www.youtube.com/watch?v=fhle9b4mjC4&feature=relmfu>, (3 pages).
ISi Twist 'N Sparkle Beverage Carbonating System YouTube video [online], isinorthamerica Mar. 23, 2011 [retrieved on Mar. 11, 2014] Retrieved from the Internet: <URL:www.youtube.com/watch?v=ySSXdwTs-cY>, (3 pages).
Sodastream webpage [online], [retrieved on Oct. 8, 2012] Retrieved from the internet: <URL:www.sodastream.com/fizz/>, (1 page).
Sodastream, Video Demo [online], [retrieved on Mar. 11, 2014] Retrieved from the Internet: <URL:www.sodastreamusa.com/PopUps/VideoDemo.html>, (1 page).

* cited by examiner

APPARATUSES, SYSTEMS, AND METHODS FOR INLINE INJECTION OF GASES INTO LIQUIDS

CROSS-REFERENCE TO RELATED APPLICATIONS

The present application claims priority to U.S. Provisional Application No. 62/209,701 filed on Aug. 25, 2015, U.S. Provisional Application No. 62/211,414 filed on Aug. 28, 2015, and U.S. Provisional Application No. 62/241,928 filed on Oct. 15, 2015, which are hereby incorporated herein by reference.

FIELD

The present application relates to apparatuses, systems, and methods for inline injection of gases into a flowing liquid, for example injecting nitrogen and/or other gases into coffee.

BACKGROUND

The following U.S. Patents are incorporated herein by reference, in entirety:

U.S. Pat. No. 9,114,368 discloses a batch carbonation apparatus that includes a housing defining a vessel cavity. The housing includes an agitation mechanism. The pressure vessel includes a cap that has a CO2 inlet and a CO2 outlet. The pressure vessel also includes a seal. The pressure vessel is moveable into an out of the vessel cavity. A locking mechanism is provided and is attached to the agitation mechanism to removably lock the cap and seal relative to the pressure vessel. A CO2 source is connected to a plurality of valves where each valve has a differing pressure. A selection toggle is attached to the housing. A control mechanism is coupled to the plurality of valves. A user selects a desired carbonation level using the selection toggle and CO2 is introduced to the pressure vessel at a specified pressure, wherein the agitation mechanism agitates liquid within the pressure vessel forming a carbonated beverage having a selected carbonation level. Also disclosed is a process of forming a carbonated beverage in a batch.

U.S. Pat. No. 9,107,449 discloses a CPU that controls an inlet valve, which connects a tank of pressurized carbon dioxide to a vessel containing the beverage to be carbonized. The tube connecting the tank of pressurized carbon dioxide to the vessel contains an orifice for reducing the carbon dioxide's flow rate, thereby increasing control over the amount of carbon dioxide introduced to the vessel. A motor agitates the vessel, causing the carbon dioxide to become absorbed in the beverage. During the pressurization process, the pressure inside the vessel is monitored by the CPU to determine whether more CO2 should be added to the vessel. An outlet valve causes excess pressure to drain from the vessel. An outlet orifice causes the pressure to release gradually, thus preventing the beverage from foaming.

U.S. Pat. No. 8,882,084 discloses an inline carbonation apparatus that includes a fluid tube having an inner diameter. At least one water orifice is linked to a water source and is attached at one end of the fluid tube. The water orifice atomizes water passing there through. A carbon dioxide source is connected to a carbon dioxide solenoid valve. The carbon dioxide solenoid valve is connected to a carbon dioxide regulator that is coupled to a carbon dioxide orifice and attached to the fluid tube in a spaced relationship from the water orifice. The atomized water has a pressure less than the carbon dioxide such that carbon dioxide is absorbed into the water forming carbonated water having a specified volume of carbonation. The carbon dioxide solenoid valve is opened and closed for a predetermined portion of a drink dispense time providing a volume of carbonated and non-carbonated fluid which upon mixing achieves a desired carbonation level.

U.S. Pat. No. 8,857,797 discloses an inline carbonation apparatus that includes a fluid tube having an inner diameter. At least one water orifice is linked to a water source and is attached to one end of the fluid tube. The water orifice includes a plurality of holes atomizing water that passes there through. A carbon dioxide orifice is linked to a carbon dioxide source and is attached to the fluid tube in a spaced relationship from the water orifice. The atomized water has a pressure less than the carbon dioxide such that carbon dioxide is absorbed into the water forming carbonated water having a specified volume of carbonation.

U.S. Pat. No. 8,840,092 discloses an inline carbonation apparatus that includes a fluid tube having an inner diameter. A water flow control module is connected to a water source. At least one water orifice is linked to the water flow control module and is attached at one end of the fluid tube. The water orifice includes a plurality of holes atomizing water passing there through. A carbon dioxide source is connected to a carbon dioxide valve. The carbon dioxide solenoid valve is connected to a carbon dioxide regulator that is coupled to a carbon dioxide orifice and attached to the fluid tube in a spaced relationship from the water orifice. The atomized water has a pressure less than the carbon dioxide such that carbon dioxide is absorbed into the water forming carbonated water having a specified volume of carbonation. The water control module regulates a water flow rate into the inline carbonation apparatus.

U.S. Pat. No. 5,792,391 discloses a carbonator comprising a tube cylinder having a closed and an open end. A disk is removably retained in the open end for providing access into the interior volume thereof. The disk provides for mounting thereto of water and carbon dioxide gas inlets, a carbonated water outlet, a safety relief valve and a water level sensor. A rigid retaining wire is bent into a square configuration wherein radiused corners thereof cooperate with slots in the open end of the cylinder to retain the disk therein. Manipulation of the retaining wire provides for removal of the disk from the cylinder when the carbonator is not pressurized.

U.S. Pat. No. 5,515,687 discloses an apparatus for providing carbonating of water. The apparatus includes a carbonating tank having a carbon dioxide inlet, a water inlet, and a carbonated water outlet. The carbonating tank is pivotally mounted to a rigid structure and connected to an electric motor for providing an undulating or rocking motion of the carbonator about its pivot mounting. The motion of the carbonating tank provides for carbonating of the water held therein.

U.S. Pat. No. 5,419,461 discloses a narrow profile substantially flat carbonator, consisting of a pair of cold drawn sheet metal halves. Each half defines corresponding alternating seams and ridges and are welded together around a perimeter thereof and along each corresponding seam. When both halves are welded together the ridges define an interior plurality of vertical interior columns, which columns are fluidly interconnected with top and bottom interior channels. The channel includes a pressure relief valve, a carbon dioxide inlet fitting, a water inlet fitting, and a level sensor fitting for retaining a level sensor. A plurality of carbonated water lines extend from the bottom of the carbonator and up along and closely adjacent a side of the carbonator. The carbonated water lines terminate at a point above the carbonator and provide for direct securing to a beverage dispensing valve. The carbonator is preferably of the integral type and held within the water tank of an ice bank type dispenser or within the ice bin of a cold plate cooled dispenser.

U.S. Pat. No. 5,038,976 discloses a beverage dispensing head and a method of dispensing that provides increased carbonation in a dispensed fountain beverage. The dispensing head has a discrete carbonated water decompression chamber in-between an upstream volumetric flow control and a downstream normally closed valve. The method includes the steps of propelling carbonated water through a flow control and then decompressing the carbonated water before it reaches the normally closed valve.

U.S. Pat. No. 4,708,827 discloses a method of and apparatus for making and dispensing carbonated water. A double diaphragm continuous delivery pneumatic liquid pump has a water pressure regulator on a water inlet line to the pump, a water fill line to a carbonator, a propellant exhaust line from the pump to the carbonator, a carbon dioxide line to the carbonator, and a gas pressure regulator for controlling the storage pressure in the carbonator and the exhaust back pressure in the pump propellant outlet. The exhaust back pressure is kept higher than the water pressure at the pump preventing diaphragm inversion.

U.S. Pat. No. 3,617,032 discloses a carbonator or carbonator-blender for producing and storing carbonated water or an admixture of carbonated water and syrup. An open-top bowl is disposed within a cylindrical carbon dioxide-pressurized chamber formed within a pressure tank. A nozzle is provided within the chamber for directing a conical stream of pressurized water into the bowl and another nozzle directs a stream of syrup against the side of the water stream. The bowl is provided with an abutment to produce a swirling action of the water and syrup there within and an aperture is formed in the bottom of the bowl for draining the admixture of water and syrup into the lower portion of the chamber.

SUMMARY

This Summary is provided to introduce a selection of concepts that are further described herein in the Detailed Description. This Summary is not intended to identify key or central features from the claimed subject matter, not is it intended to be used as an aid in limiting the scope of the claimed subject matter.

In certain examples, a gas injection device for injecting a gas into a liquid to form a solution includes a flow channel that conveys a liquid from an upstream inlet configured to receive the liquid to a downstream outlet configured to dispense the solution and a sparger having a porous surface positioned in the flow channel. The sparger is configured to inject the gas into the liquid through the porous surface as the liquid flows across the porous surface.

In certain examples, a gas injection system for injecting a gas into a liquid to form a solution includes a flow channel that conveys a liquid from an upstream inlet configured to receive the liquid and a downstream outlet configured to dispense the solution, sparger positioned in the flow channel, a solution pressure detection device configured to sense a pressure of the solution in the flow channel, and a liquid valve configured to regulate flow of the liquid in the flow channel based on the pressure sensed by the solution pressure detection device. The sparger is configured to inject the gas into the liquid through the porous surface as the liquid flows across the surface.

In certain example, a method of injecting a gas into a liquid includes selecting a flow channel that conveys a liquid from an upstream inlet configured to receive the liquid to a downstream outlet configured to dispense the solution; positioning a sparger having a porous surface in the flow channel such that the liquid flows across the porous surface and injects the gas into the liquid through the porous surface; sensing the pressure of the solution in the flow channel with a solution pressure detection device; and regulating the flow of the liquid with a liquid valve based on the pressure sensed by the solution pressure detection device.

BRIEF DESCRIPTION OF THE DRAWINGS

Examples of the present disclosure are described with reference to the following drawing FIGURES. The same numbers are used throughout the FIGURES to reference like features and components.

DETAILED DESCRIPTION

Figure 1:
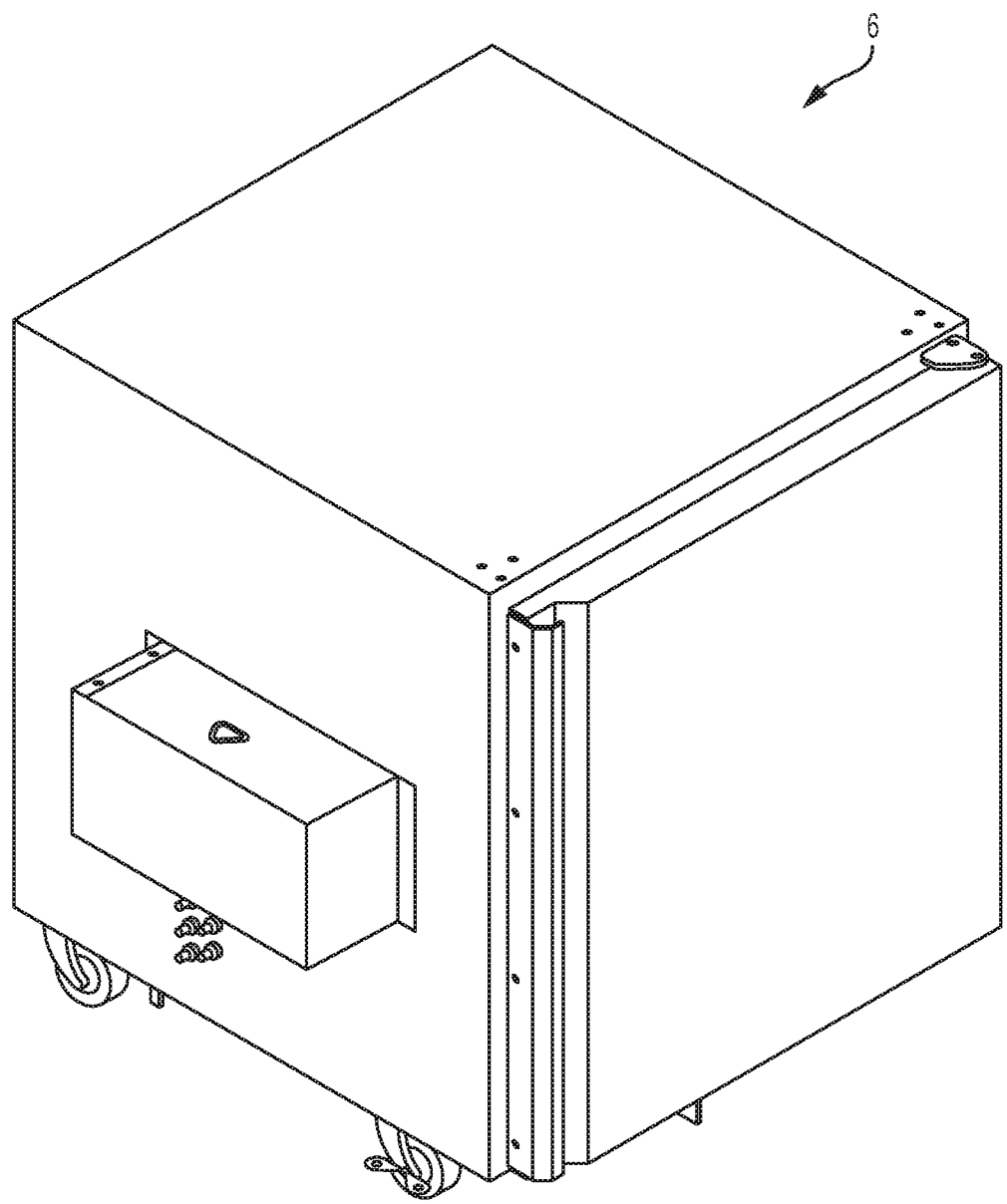
FIG. 1 is an example gas injection machine.
Figure 2:
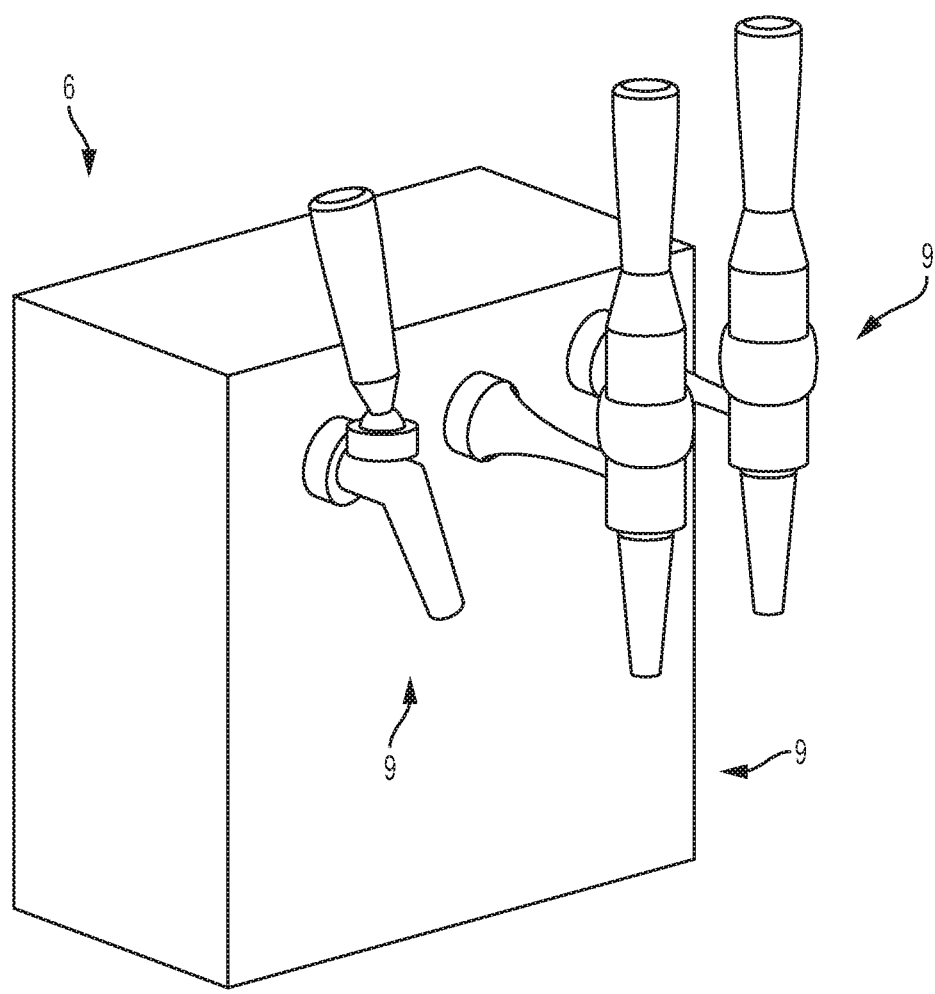
FIG. 2 is an example tap.

In the present disclosure, certain terms have been used for brevity, clarity and understanding. No unnecessary limitations are to be inferred therefrom beyond the requirement of the prior art because such terms are used for descriptive purposes only and are intended to be broadly construed. The different apparatuses, systems, and methods described herein may be used alone or in combination with other apparatuses, systems, and methods. Various equivalents, alternatives and modifications are possible within the scope of the appended claims.

The present disclosure is described herein using several definitions, as set forth below and throughout the application. Unless otherwise specified or indicated by context, the terms "a", "an", and "the" mean "one or more." For example, "a compound" should be interpreted to mean "one or more compounds."

As used herein, "about," "approximately," "substantially," and "significantly" will be understood by persons of ordinary skill in the art and will vary to some extent on the context in which they are used. If there are uses of these terms which are not clear to persons of ordinary skill in the art given the context in which they are used, "about" and "approximately" will mean plus or minus ≤10% of the particular term and "substantially" and "significantly" will mean plus or minus >10% of the particular term.

As used herein, the terms "include" and "including" have the same meaning as the terms "comprise" and "comprising" in that these latter terms are "open" transitional terms that do not limit claims only to the recited elements succeeding these transitional terms. The term "consisting of," while encompassed by the term "comprising," should be interpreted as a "closed" transitional term that limits claims only to the recited elements succeeding this transitional term. The term "consisting essentially of," while encompassed by the term "comprising," should be interpreted as a "partially closed" transitional term which permits additional elements succeeding this transitional term, but only if those additional elements do not materially affect the basic and novel characteristics of the claim.

Through research and experimentation, the present inventors have endeavored to develop apparatuses, systems, and methods that effectively inject or dissolve gas into a liquid inline. Furthermore, the present inventors have endeavored to develop apparatuses, systems, and methods that provide efficient and repeatable injection or dissolution of a gas into a liquid inline and mixing gas at constant proportions such that a final solution (e.g. coffee injected with nitrogen) has a consistent gas concentration level and a foam head. The inventors have recognized that carbon dioxide gas bonds well with water when chilled, but other forms of gas, such as nitrogen (N2), do not bond as well with water. The inventors have observed that the N2 and other gases almost instantly break out of solution once the pressure head is removed from the solution, and therefore, controlling and repeating dispenses of solutions with gases can be difficult.

Accordingly, the present inventors have invented machines that quickly and effectively inject or dissolve a gas (e.g. nitrogen, CO2) in a liquid, such as coffee. In certain examples, the concentration of the gas in the solution can be efficiently adjusted to various levels based on the preferences of the operator and/or consumer. The machine can include a gas injection device that has a porous member that is pressurized with gas. The gas is pressurized to a slightly higher pressure than the pressure of the liquid passing through the device such that the gas injects or dissolves into the liquid flowing past the porous surface. When the flow of the liquid stops, the pressure of the gas and the pressure of the liquid equalizes such that the gas does not inject into the liquid and the liquid does not enter or clog the gas injection device.

Figure 3:
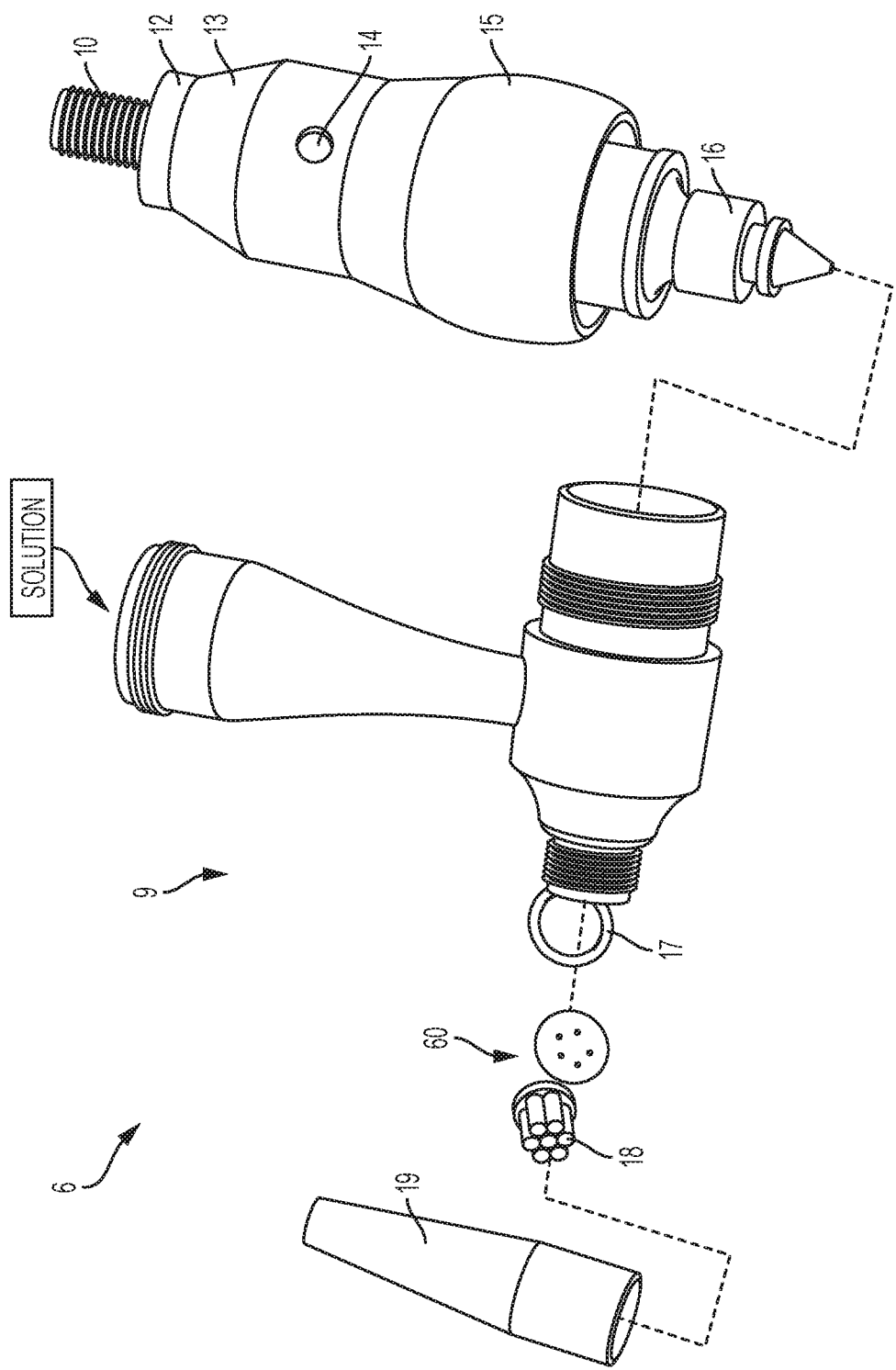
FIG. 3 is an exploded view of an example tap.

Referring to FIGS. 1-6, an example gas injection machine 6 includes a gas injection device 20 (see FIGS. 3-5) for injecting a gas into a liquid to form a solution (e.g. coffee with nitrogen gas). The solution is dispensed to the operator or user through a dispensing tap 9 (see FIG. 2) coupled to the machine 6 and/or another structure (e.g. a bar top, a counter, a table). In certain examples, the gas injection device 20 is positioned close to the tap 9. Referring to FIG. 3, an exploded view of an example tap 9 is depicted. The tap 9 includes a threaded rod 10 for attachment of a tap handle (not shown), a nut 12, a cam 13, a roll pin 14, a top cap 15, a diaphragm 16, multiple O-rings 17, a flow straightener 18, and a nozzle 19. The tap 9 and/or a pipe (not shown) between the gas injection device 20 and the tap 9 can create a backpressure on the solution. In certain examples, the backpressure is created by the nozzle 19. In certain examples, the tap 9 includes a backpressure device 60, such as a porous restrictor plate 61 defining multiple holes, that creates the backpressure. In one example, the restrictor plate 61 has five circular holes each having a diameter of $30/1000$ inch. The number and arrangement of the holes can vary and the diameter of the holes can range for example from $3/1000$ inch to $75/1000$ inch.

Figure 4:
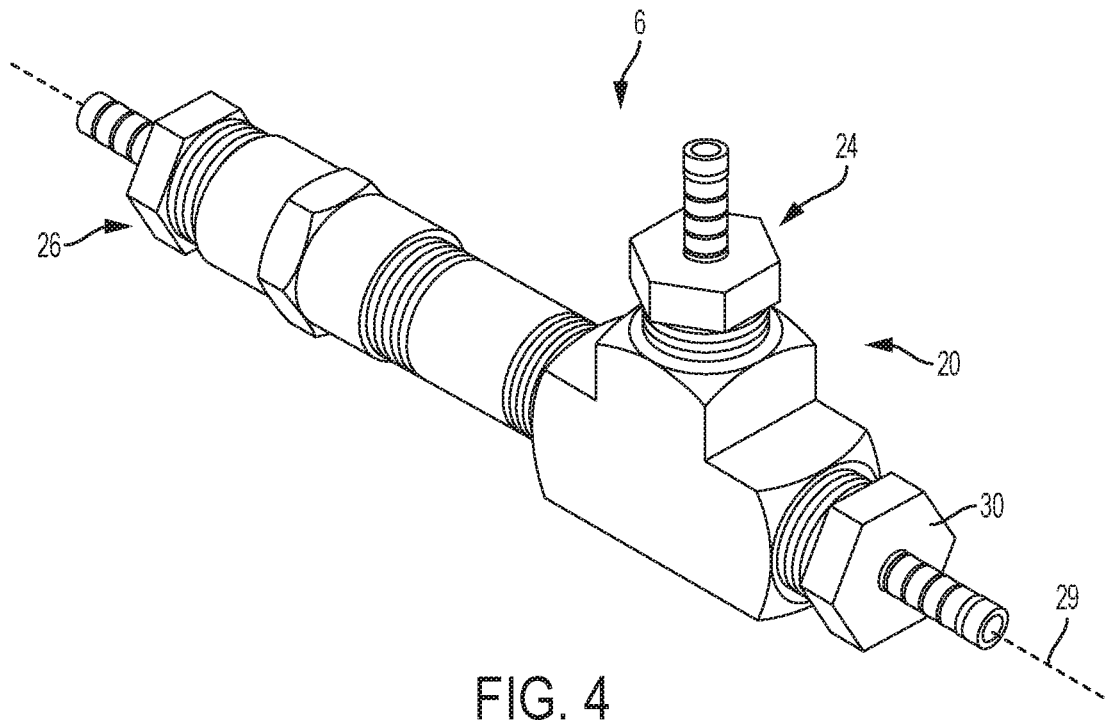
FIG. 4 is an example gas injection device.
Figure 5:
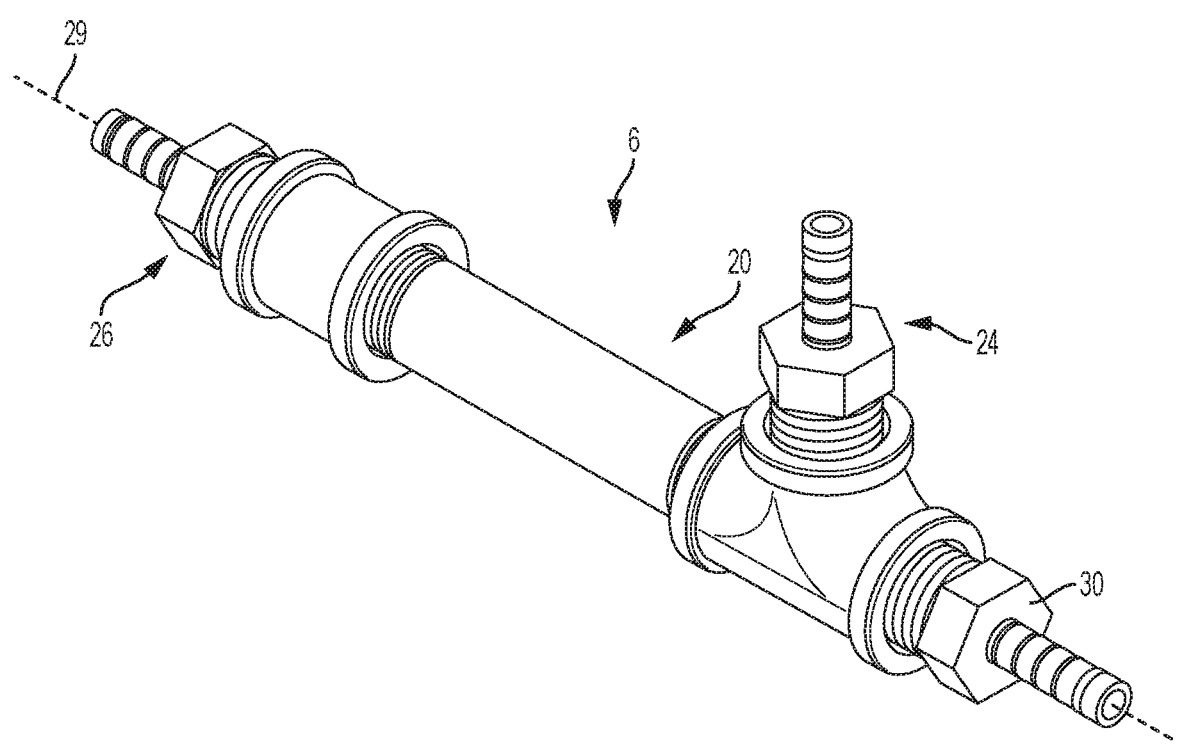
FIG. 5 is an example gas injection device.
Figure 6:
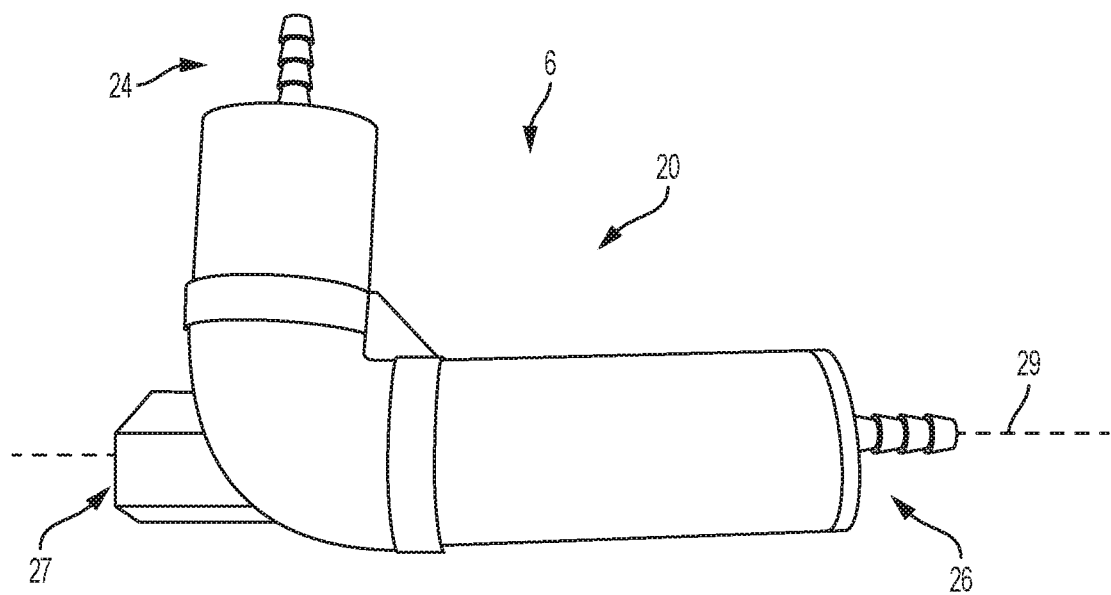
FIG. 6 is an example gas injection device.

Referring to FIGS. 4-6, example gas injection devices 20 are depicted (FIG. 4 is "T"-shaped configuration; FIG. 5 is an alternative "T"-shaped configuration; FIG. 6 is an elbow configuration). The configuration and/or shape of the gas injection device 20 is exemplary and can vary from that which is shown.

Figure 7:
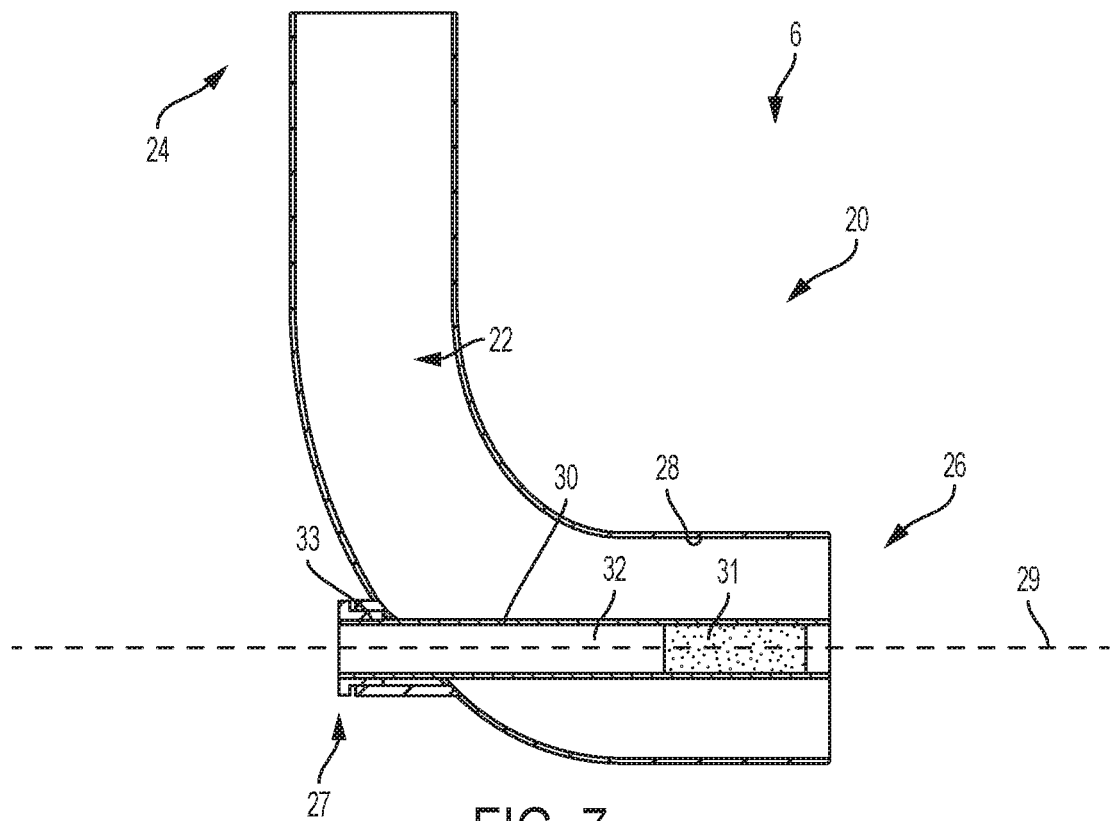
FIG. 7 is a cross section of an example gas injection device.
Figure 9:
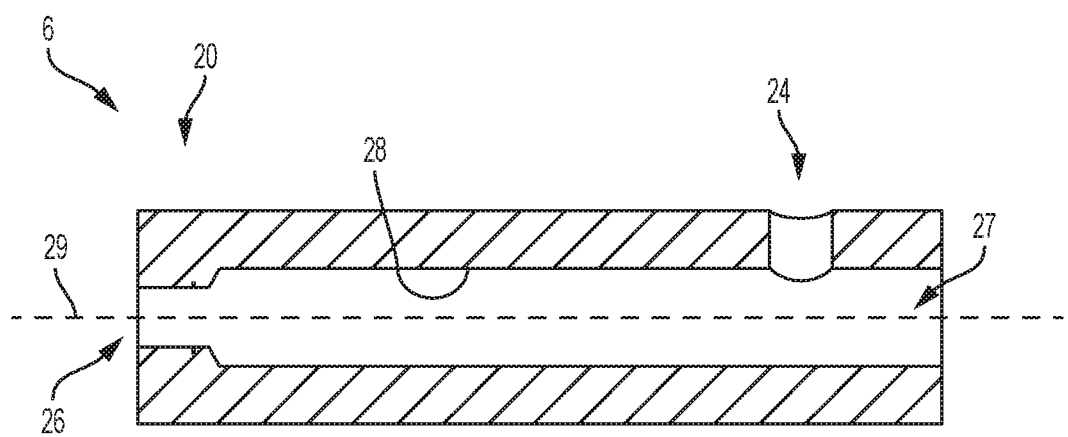
FIG. 9 is a cross section of an example gas injection device.

Referring to FIG. 7, a cross sectional view of an example gas injection device 20 is depicted. The gas injection device 20 defines a flow channel 22 that conveys a liquid from an upstream inlet 24 configured to receive the liquid to a downstream outlet 26 configured to dispense the solution. The solution is formed in the gas injection device 20 and includes a selected ratio of liquid and gas. The flow channel 22 has an inner perimeteral surface 28 that extends along an axis 29. The gas injection device 20 defines a hole 27 that extends transversely to the flow channel 22. The hole 27 includes a connector member (not shown), such as screw threads, quick disconnect device, or the like. The gas injection device 20 includes a sparger 30 (described herein) for injecting the gas into the liquid. Reference is also made to FIG. 9 which depicts cross sectional view of another example gas injection device 20 without the sparger 30.

Figure 8:
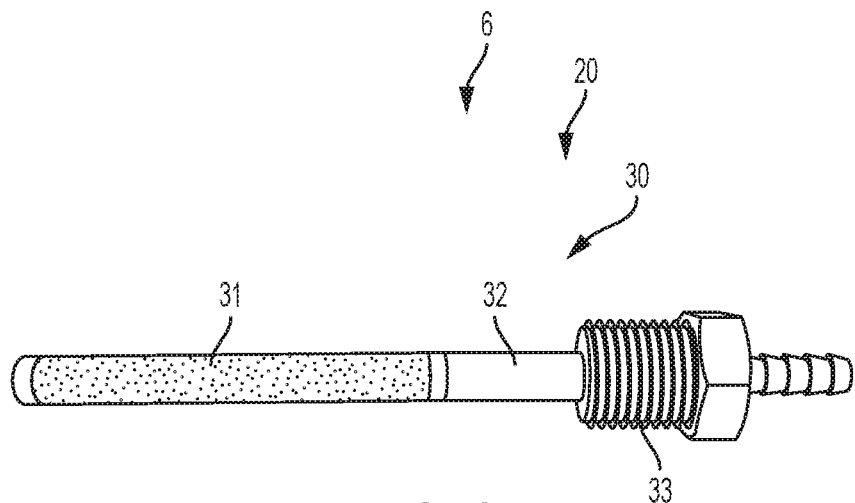
FIG. 8 is an example sparger.

Referring to FIGS. 8 and 9, the sparger or injector 30 has a connector member 33, a porous surface 31, and a non-porous surface 32. The sparger 30 is received in the hole 27 such that the sparger 30 is positioned in the flow channel 30 (see FIG. 7). The connector member 33 of the sparger 30 couples to the connector member 33 of the hole 27. The connector member 33 can be any suitable connector member such as friction joints, adhesive, screw threads, quick disconnect devices, and the like. In one example, the sparger 30 includes screw threads that engage or mate with screw threads of the hole 27. The porous surface 31 is tapered and is concentric with the inner perimeteral surface 28. In certain examples, the distance between the porous surface 31 and the inner perimeteral surface 38 is important for repeatably consistent injection of gas in the liquid. The distance between the porous surface 31 and the inner perimeteral surface 28 optimally ranges from $1/16$ and $1/2$ inches. The porous surface 31 is stainless steel expanded mesh having a plurality of pores having diameters between 0.2 and 5.0 microns such that the bubble size of the gas in the solution in consistent. The length of the sparger 30 and/or the porous surface 31 is proportional to the expected effective life of the sparger 30 (e.g. a longer porous surface 31 has a longer effective life; a shorter porous surface 31 has a shorter effective life). The length of the porous surface 31 and/or the non-porous surface 23 can vary based on the specific application of the device 20 and/or required gas injection or dissolution performance.

The sparger 30 is configured to inject the gas into the liquid through the porous surface 31 as the liquid flows across the porous surface 31. The porous surface 31 is elongated such that the liquid flows tangentially across the porous surface 31 and the gas injects transversely into the liquid. The liquid flows under laminar flow conditions across the porous surface 31. In operation, the liquid flows through the flow channel 22 such that liquid "scrubs" gas in the form of bubbles from the porous surface 31. The non-porous surface 32 is positioned adjacent to and upstream of the porous surface 31. In certain examples, the non-porous surface 32 is positioned upstream of the porous surface 31, and the liquid flows under non-laminar flow conditions across the non-porous surface 32.

Figure 10:
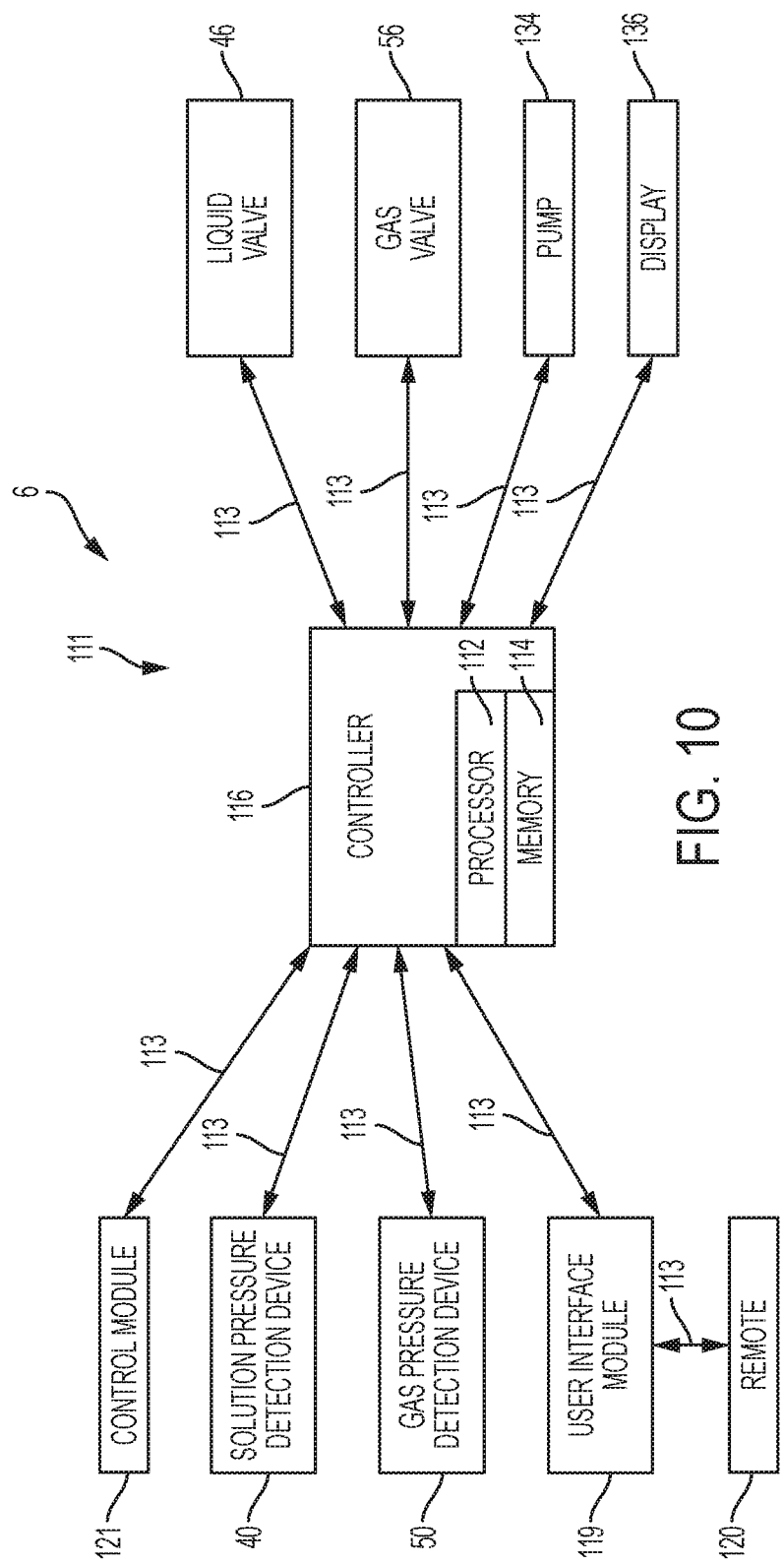
FIG. 10 is an example system diagram.

Referring to FIG. 10, the gas injection machine 6 includes a solution pressure detection device 40 configured to sense the pressure of the solution in the flow channel 22. In certain examples, a gas pressure detection device 50 is also included and senses the pressure of the gas in the sparger 30. The devices 40, 50 can be switches, sensors, and/or the like, and the devices 40, 50 can be vented to atmosphere. In certain examples, the solution pressure detection device 40 is an adjustable pressure switch that is capable of balancing the dynamic and static gas flow pressure to prevent air pockets from forming in the gas injection device 20. A manufacturer of suitable adjustable pressure switches is BARKSDALE (see model no. MSPS-XX100SFQ121). The adjustable pressure switch can be set based on the pressure of the solution, gas, liquid, and/or any combination herein and can be calibrated for each application of the gas injection device 20.

Referring to FIG. 10, the gas injection machine 6 includes a liquid valve 46 configured to regulate the flow of the liquid into the flow channel 22 based on the pressure sensed by the solution pressure detection device 40 and a gas valve 56 configured to regulate the flow of the gas into the sparger 30 based on the pressure sensed by the solution pressure detection device 40 and/or the gas pressure detection device 50. The valves 46, 56 are mixing valves, solenoid valves, check valves, or any other suitable valve. In certain examples, the gas valve 56 is configured to increase the flow of the gas to thereby increase the pressure of the gas above the pressure of the liquid such that the gas injects into the liquid through the porous surface 31 of the sparger 30. In certain examples, the gas valve 56 is configured to maintain the pressure of the gas substantially equal to the pressure of the liquid to thereby prevent the liquid from entering the sparger 30 and/or prevent the gas from back flowing to the liquid source. In certain examples, the liquid valve 46 and the gas valve 56 are configured to maintain a dynamic pressure delta range between the pressure of the gas and the pressure of the liquid of 0.75 to 5.0 pounds per square inch (PSI). In one example, the liquid valve 46 is configured to increase the flow of the liquid when the solution pressure detection device 40 senses a decrease in the pressure of the liquid.

FIG. 10 depicts an example system diagram 111 of the gas injection machine 6. In the example shown, the system 111 includes a controller 116 that is programmable and includes a processor 112 and a memory 114. The controller 116 can be located anywhere in the system 111 and/or located remote from the system 111 and can communicate with various components of the dispenser via wired and/or wireless links, as will be explained further herein below. Although FIG. 10 shows a single controller 116, the system 111 can include more than one controller 116. Portions of the method can be carried out by a single controller or by several separate controllers. Each controller 116 can have one or more control sections or control units. One having ordinary skill in the art will recognize that the controller 116 can have many different forms and is not limited to the example that is shown and described. For example, here the controller 116 carries out the dispensing control methods for the entire system 111, but in other examples dispensing control unit could be provided.

In some examples, the controller 116 may include a computing system that includes a processing system, storage system, software, and input/output (I/O) interfaces for communicating with devices such as those shown in FIG. 10, and about to be described herein. The processing system loads and executes software from the storage system, such as software programmed with a dispensing control method. When executed by the computing system, dispensing control software directs the processing system to operate as described herein below in further detail to execute the dispensing control method. The computing system may include one or many application modules and one or more processors, which may be communicatively connected. The processing system can comprise a microprocessor (e.g., processor 112) and other circuitry that retrieves and executes software from the storage system. Processing system can be implemented within a single processing device but can also be distributed across multiple processing devices or sub-systems that cooperate in existing program instructions. Non-limiting examples of the processing system include general purpose central processing units, applications specific processors, and logic devices.

The storage system (e.g., memory 114) can comprise any storage media readable by the processing system and capable of storing software. The storage system can include volatile and non-volatile, removable and non-removable media implemented in any method or technology for storage of information, such as computer readable instructions, data structures, program modules, or other data. The storage system can be implemented as a single storage device or across multiple storage devices or sub-systems. The storage system can further include additional elements, such as a controller capable of communicating with the processing system. Non-limiting examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system. The storage media can be a non-transitory or a transitory storage media.

In one non-limiting example, the controller 116 communicates with one or more components of the system 111 via a communication link 113, which can be a wired or wireless link. The controller 116 is capable of monitoring and controlling one or more operational characteristics of the system 111 and its various subsystems by sending and receiving control signals via the communication link 113. It should be noted that the extent of connections of the communication link 113 shown herein is for schematic purposes only, and in non-limiting examples the communication link 113 can in fact provide communication between the controller 116 and each of the sensors, devices, and various subsystems described herein, although not every connection is shown in the drawing for purposes of clarity.

The system 111 may include several modules. For example, the user interface module 119 may be connected to a remote 120, a control panel, a connection port, and/or the like. In another non-limiting example, a control module 121 such as an internet or network module may connect the dispenser to the internet. The control module 121 may be wireless or wired, and the control module 121 may allow a remote user to control the components of the dispenser. The controller 116 may further relay data to and/or receive data from components of the dispenser such as switches, valves, pumps 134, displays 136, and/or the like.

In certain examples, the solution pressure detection device 40, gas pressure detection device 50, liquid valve 46, and/or gas valve 56 can be electrically coupled to the controller 116 by communication links 113 and controlled by the controller 116. The solution pressure detection device 40 and/or the gas pressure detection device 50 can relay a signal to the controller 116 to indicate when the pressure of the solution or gas, respectively, exceeds a predetermined level. Alternately, the solution pressure detection device 40 and/or the gas pressure detection device 50 can relay a signal to the controller 116 indicative of the pressure of the solution pressure or gas pressure, respectively (e.g. solution pressure is 7.0 PSI; gas pressure is 2.5 PSI). The controller 116 controls the liquid valve 46 and/or the gas valve 56 by opening and closing each valve 46, 56 based on the pressures sensed by the solution pressure detection device 40 and/or the gas pressure detection device 50. In certain examples, the controller 11 maintains the solution at a pressure having a maximum delta of 0.75 to 1.0 PSI. The controller 116 maintains the pressure during dispense of the solution from the tap 9, when the operator cycles the machine 6 on and off, when the operator cycles the tap from an open position to a closed position, if the liquid from the liquid source is running low, and/or when a loss of liquid or gas pressure is sensed. The gas injection machine 6 and/or controller 116 can be configured as a closed-loop system wherein the controller 116 continuously receives signals from the solution pressure detection device 40 and/and the gas pressure detection device 50 and continuously controls the liquid valve 46 and/or the gas valve 56 to maintain the selected pressure of the solution. As the solution is dispensed, the controller 116 determines the amount of backpressure acting on the sparger 30 based on the solution pressure detection device 40 and/or the gas pressure detection device 50 and sends a signal to open or close the gas valve 56 and/or liquid valve 46.

Figure 11:
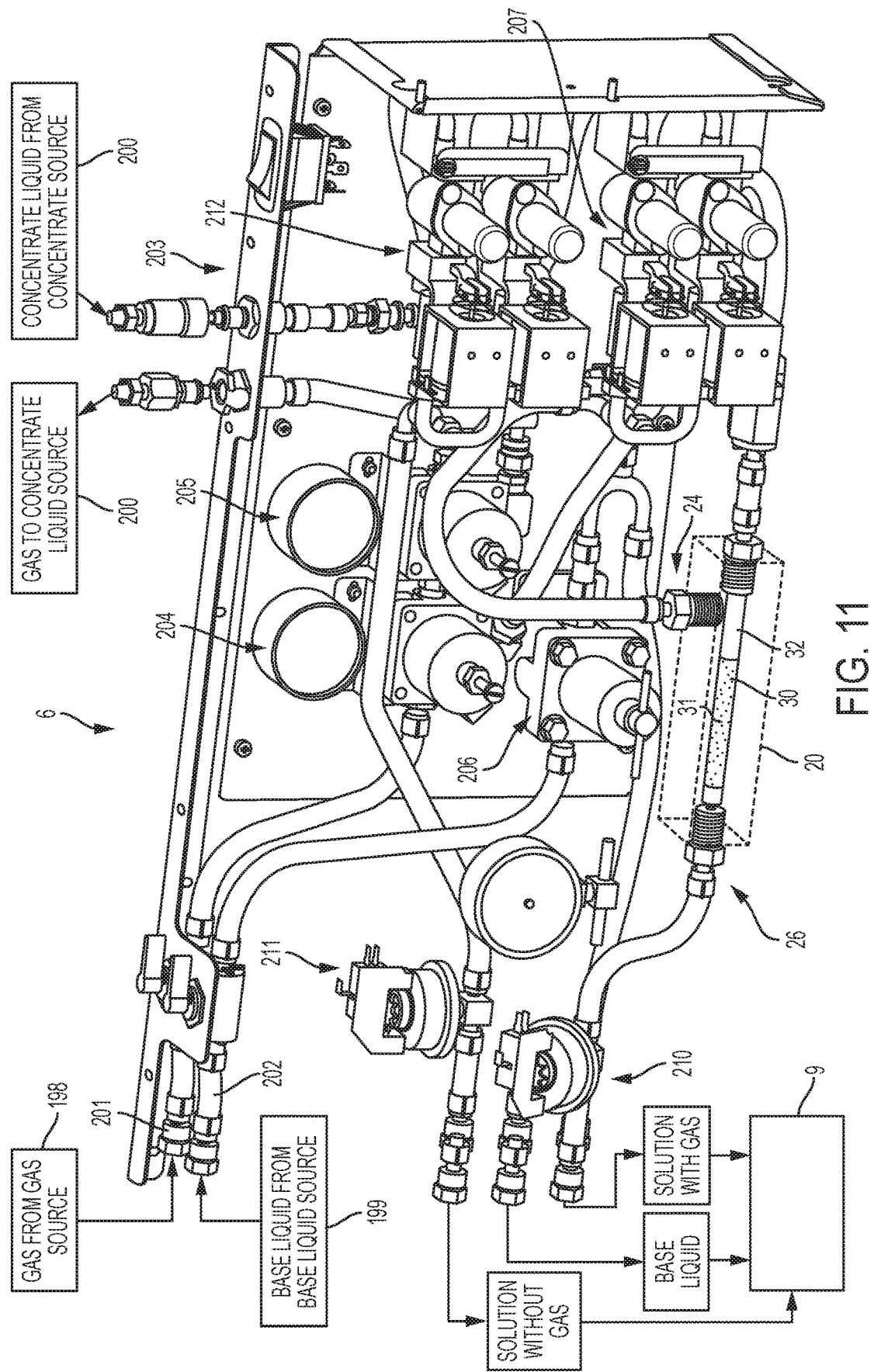
FIG. 11 is an example plumbing diagram for the gas injection machine, the gas injection device depicted in dashed lines.

Referring to FIG. 11, an example plumbing layout for the gas injection machine 6 is depicted. A gas inlet 201 couples to a gas source 198 (e.g. nitrogen), a base liquid inlet 202 couples to a base liquid source 199 (e.g. water), and concentrate liquid inlet 203 couples to a concentrate liquid source 200 (e.g. coffee concentrate). The gas conveys to a first regulator 204 that regulates flow of gas to the sparger 30 and a second regulator 205 that regulates flow of gas to the concentrate liquid source 200 thereby pressurizing the concentrate liquid source 200. A third regulator 206 regulates the flow of the base liquid to the tap 9 for flushing or cleaning the tap 9 and/or mixing valves (described herein). A first pair of mixing valves 207 mix base liquid and concentrate liquid and supply a mixed liquid (i.e. a liquid with based liquid and concentrate liquid) to the upstream inlet 24 of the gas injection device 20. Example mixing valves or flow control assemblies are commercially available from Cornelius (Part #620063709). The gas is conveyed to the sparger 30 and is injected into the mixed liquid by the sparger 30. The solution (e.g. mixed liquid with gas injected therein) conveys downstream from the gas injection device 20. A first pressure detection device 210 is included downstream of the gas injection device 20 to detect the pressure of the solution with gas injected therein. A second pressure detection device 211 is included downstream of a second pair of mixing valves 212 to detect the pressure of a solution without gas injected therein (e.g. for beverage orders for solutions without gas injected into the solution). The second pair of mixing valves 212 mix the base liquid and the concentrate and supply the mixed liquid to the tap 9. In certain examples, the base liquid 199 and/or the concentrate liquid source 200 is conveyed to the gas injection device 20 by a pump (not shown).

Figure 12:
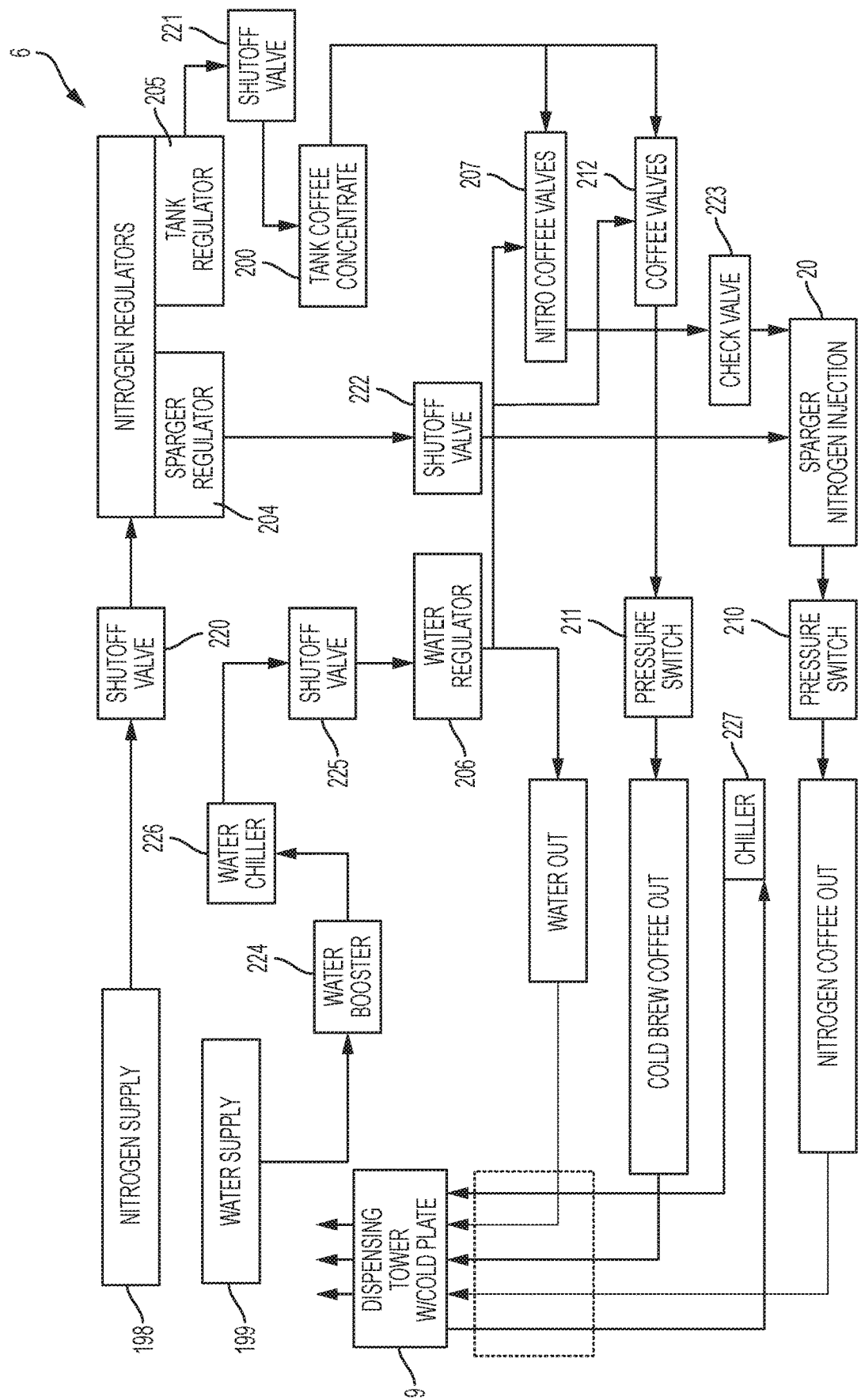
FIG. 12 is an example electrical diagram for the gas injection machine.

Referring to FIG. 12, an example plumbing diagram for the gas injection machine 6 is depicted, including components and features described above. A gas source 198 conveys the gas to a first shutoff valve 220 that allows the operator to stop flow of the gas into the gas injection machine 6. A second shutoff valve 221 is positioned downstream of the second regulator 205 and upstream of the concentrate liquid source 200. The second shutoff valve 221 allows the operator to prevent flow of the gas to the concentrate liquid source 200. A third shutoff valve 222 is positioned downstream of the first regulator 204 and allows the operator to prevent flow of the gas to the gas injection device 20. A check valve 223 is positioned upstream of the gas injection device 20 to prevent gas from the backing up into the concentrate liquid source 200. A water booster or pump 224 is coupled downstream of the base liquid source 199 convey the base liquid through the gas injection machine 6. Any suitable commercially available water booster or pump 224 can be utilized with the gas injection machine 6. In certain examples, the pump 224 is configured to supply the base liquid at greater than 35.0 pounds per square inch gage (psig) continuously and/or greater than 2.0 ounces per second. A base liquid chiller 226 is included to cool the base liquid. In certain examples, cooling the liquid before injecting the gas into the liquid can increase dissolution of the gas into the liquid, maintain the gas in solution, and/or control the temperature of the solution. Any suitable commercially available chiller 226 can be utilized with the gas injection machine 6. In certain examples, the chiller 226 has a cooling capacity of greater than 8.0 gallons per hour and/or a flow rate of greater than 2.0 ounces per second. A fourth shutoff valve 225 is positioned downstream of the base liquid source 199 and allows the operator to prevent flow of the base liquid into the gas injection machine 6. A solution chiller 227 is included to chill the solutions (e.g. solution with gas injected therein, solution without gas injected therein) as the solutions are conveyed to the taps 9. In certain examples, chilling the solutions conveyed from the gas injection device 20 maintains the gas in solution.

Figure 13:
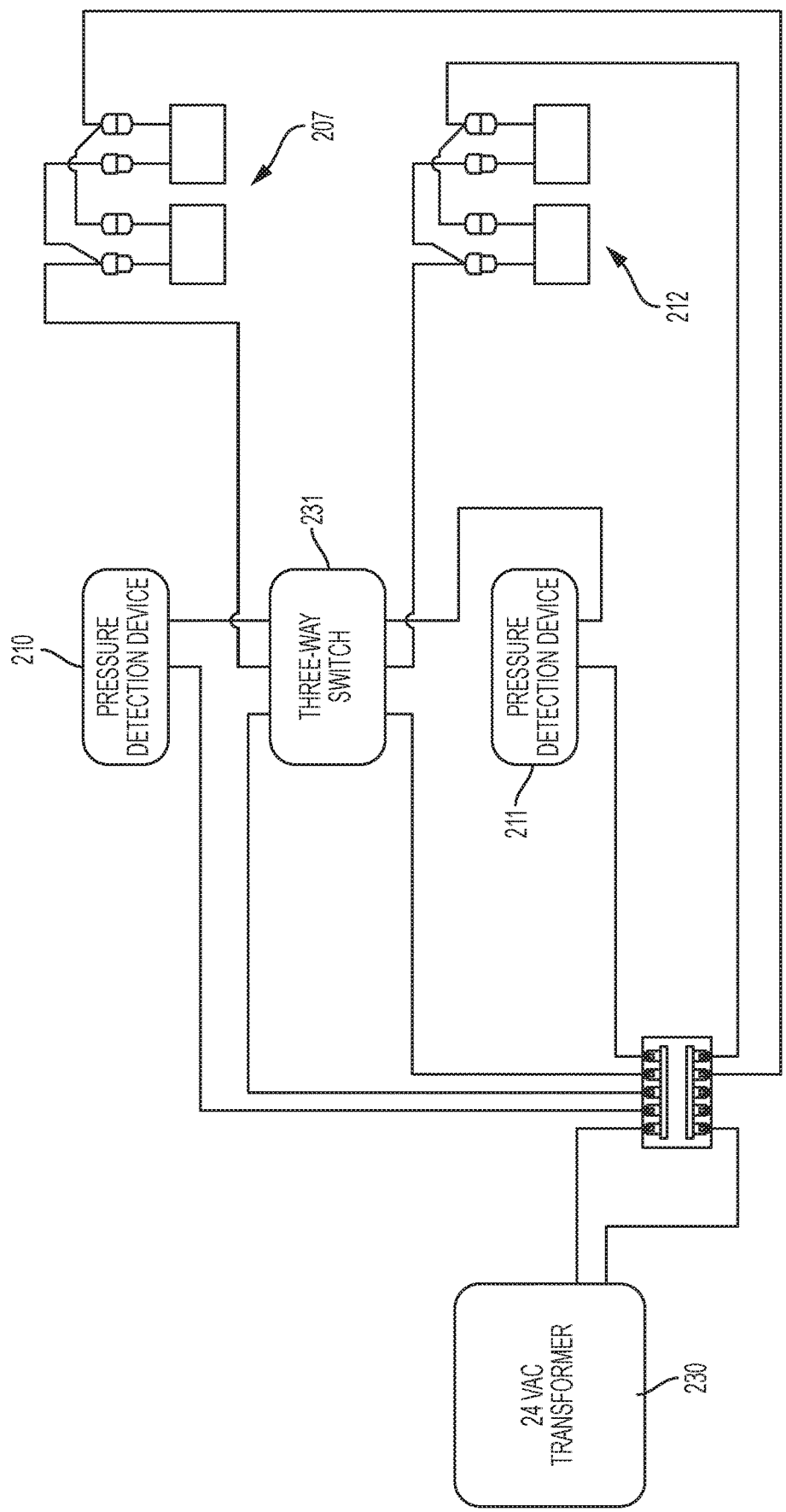
FIG. 13 is example electrical configuration for the system.

Referring to FIG. 13, an example electrical configuration is depicted. A 24 VAC transformer 230 is connected to a three-way switch 231 which allows the gas injection machine 6 to operate and also be turned on/off for cleaning, flushing, and/or other like operations. When the first pressure switch 210 and/or the second pressure switch 211 are activated, the 24 volts runs through the switches 210, 211 to the pairs of mixing valves 207, 212, respectively.

The present disclosure thus provides methods for injecting or dissolving the gas into the liquid to form the solution, including selecting the flow channel 22 that conveys the liquid from the upstream inlet 24 to the downstream outlet 26; positioning the sparger 30 having the porous surface 31 in the flow channel 22 such that the liquid flows across the porous surface 31 and injects the gas into the liquid through the porous surface 31; sensing the pressure of the solution in the flow channel 22 with the solution pressure detection device 40; and regulating the flow of the liquid with the liquid valve 46 based on the liquid pressure sensed by the solution pressure detection device 40. In certain examples, sensing the pressure of the gas in the sparger 30 with the gas pressure detection device 50; regulating the flow of the gas with the gas valve based on the gas pressure sensed by the gas pressure detection device 50; positioning the backpressure device 60 in the flow channel 22 downstream of the sparger 30 such that the backpressure device 60 applies a backpressure on the solution; and/or controlling the liquid valve 46 and the gas valve 56 with the controller 116 that is configured to receive signals from the solution pressure detection device 40 and the gas pressure detection device 50 such that the pressure of the gas is greater than the pressure of the liquid whereby the gas injects into the liquid.

In certain examples, bias relays or bias regulators are included to monitor the pressures in the machine to control components that coupled to or plug into the controller system e.g. as an input pressure is applied to the system, the controller can be programmed to give it an input signal and the pressure output is modified based on the input signal. In certain examples, inclusion of one or more controllers, pressure controls, and/or flow controls increases the consistency of poured solutions was surprisingly repeatable once the machine is properly tuned. In certain examples, controlling, sensing, and/or auto-adjusting the pressure of the gas and/or liquid from the gas and liquid sources increases the consistency of the solution, especially in transitions between static and dynamic flows (e.g. stop-flow to moving-flow) of the solution. In certain examples, the controller is configured to control the pressures of the gas source and/or liquid source.

In certain examples, when the machine is not dispensing the solution, the liquid pressure and the gas pressure are higher than the pressure acting on the solution when a beverage is being dispensed. The higher pressures cause at least one pressure detection device to close at least one valve. In certain examples, the pressure detection devices maintain the gas pressure at a pressure that is higher than the pressure of the liquid when the solution is being dispensed. Maintaining the gas at a pressure that is higher that the pressure of the liquid can prevent the liquid from clogging or backflowing into the sparger.

In certain examples, the valves maintain flow rates and pressures across multiple incoming fluids (e.g. gases, liquids, carbonated beverages, such that multiple fluids mix together in the device. The valves can be set at any selected fluid mixing ratio (e.g. 1:1, 5:1, 30:1).

In certain examples, the dispensing system for injecting a gas flow into a fluid flow to create a solution includes a gas injection device including a porous element. The porous element receives a pressurized gas flow having a slightly higher pressure than the pressure of the fluid flow. The dispensing system includes a restrictor plate configured to apply a backpressure on the injection device, and a controller is configured to a continuously monitor changes in pressures acting on the dispensing system and send signals to the valves.

In certain examples, the gas flow and/or the liquid flow are controlled by modifying pressures in relatively small amounts. The pressures of the gas flow and/or liquid flow can range from 10.0 to 100.0 PSI and are controlled in increments of 0.25 to 0.75 PSI dynamic pressure. Through research and experimentation, the inventors have discovered that the dynamic pressure delta between the gas flow pressure and the liquid flow pressure can range from 0.1 to 3.0 PSI. It was further discovered, that the dynamic pressure delta range of 0.5 to 5.0 PSI was surprisingly effective in producing consistent solution properties. The gas flow and/or the liquid flow may also be subject to a backpressure created between the restrictor plate and/or the sparger. The backpressure created by the restrictor plate is dependent on the pressure for the gas flow and/or liquid flow and therefore can vary (e.g. the backpressure created by the restrictor plate 61 is 25.0 to 30.0 PSI). The present inventors have found that the combination of the applied pressure of the gas flow and/or liquid flow with the backpressure from the restrictor plate surprisingly and advantageously maintains consistent solution pours. Further, the combination maintains the injected gas in the solution downstream of the sparger.

In certain examples, the gas injection device includes a filter for filtering particles from the liquid and/or the gas to prevent clogging of the sparger.

This written description uses examples to disclose the invention, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for injecting nitrogen gas into a liquid to form a beverage solution, the system comprising:
    a flow channel that conveys the liquid from upstream to downstream;
    a sparger located in the flow channel, the sparger having a porous surface through which the nitrogen gas is injected into the liquid to thereby form the beverage solution;
    a liquid valve configured to regulate flow of the liquid into the flow channel;
    a gas valve configured to regulate flow of the nitrogen gas into the sparger;
    a backpressure device located downstream of the sparger, the backpressure device causing a backpressure on the beverage solution;
    a solution pressure detection device configured to sense a pressure of the solution downstream of the sparger;
    a gas pressure detection device configured to sense pressure of the nitrogen gas dispensed via the sparger; and
    a controller having a processor and a memory, wherein the controller is configured to control the liquid valve and the gas valve based upon the pressure of the beverage solution sensed by the solution pressure detection device and based upon the pressure of the nitrogen gas sensed by the gas pressure detection device;
    wherein the controller is configured to control the gas valve so as to maintain the pressure of the nitrogen gas at a level above the pressure of the liquid as the liquid flows past the porous surface such that the nitrogen gas continuously injects into the liquid via the porous surface; and
    wherein the controller is configured to determine an amount of the backpressure acting on the sparger based on the pressure of the solution sensed by the solution pressure detection device and then control the gas valve and liquid valve to maintain the predetermined pressure of the beverage solution.

2. The system according to claim 1, further comprising a tap that receives and dispenses the beverage solution from the flow channel.

3. The system according to claim 1, wherein the backpressure device comprises a porous restrictor plate.

4. The system according to claim 3, wherein the porous restrictor plate comprises a plurality of holes through which the beverage solution is conveyed, each hole in the plurality of holes having a diameter of $3/1000$ inch to $75/1000$ inch.

5. The system according to claim 1, wherein the sparger has a non-porous surface and a porous surface, wherein the porous surface is concentric with the flow channel and configured to inject the nitrogen gas into the liquid as the liquid flows across the porous surface.

6. The system according to claim 5, wherein the porous surface is spaced apart from an inner perimeter surface of the flow channel by 1/16 inch to 1/2 inch.

7. The system according to claim 5, wherein the porous surface is elongated such that the liquid tangentially flows across the porous surface as a laminar flow and the nitrogen gas is injected transversely into the liquid.

8. The system according to claim 1, wherein the controller is configured to control the liquid valve and the gas valve to maintain a dynamic pressure delta range between the pressure of the nitrogen gas and the pressure of the liquid of 0.5 to 5.0 pounds per square inch.

9. The system according to claim 1, wherein the controller is configured to control the liquid valve and the gas valve so as to maintain the beverage solution at a pressure having a maximum delta range between the pressure of the nitrogen gas and the pressure of the liquid of 0.75 to 1.0 pounds per square inch.

10. The system according to claim 1, wherein the controller receives signals from the solution pressure detection device and controls the liquid valve and gas valve to maintain the beverage solution at a predetermined pressure.

11. The system according to claim 1, wherein the liquid comprises a mixture of base liquid and concentrate liquid.

12. The system according to claim 11, wherein the liquid comprises coffee.

13. The system according to claim 11, further comprising a chiller configured to cool the base liquid prior to conveyance to the sparger.

14. A system for injecting nitrogen gas into a liquid to form a beverage solution, the system comprising:
a flow channel that conveys the liquid from upstream to downstream;
a sparger located in the flow channel, the sparger having a porous surface through which the nitrogen gas is injected into the liquid to thereby form the beverage solution;
a liquid valve configured to regulate flow of the liquid into the flow channel;
a gas valve configured to regulate flow of the nitrogen gas into the sparger;
a tap that receives and controls dispense of the beverage solution from the flow channel to a dispensing nozzle, wherein the tap is operable by a user of the system so as to dispense the beverage solution from the system, and more particularly wherein the tap is configured to allow the user to open and close the tap, wherein opening the tap causes the beverage solution to be dispensed from the system via the dispensing nozzle, and wherein closing the tap prevents the beverage solution from being dispensed from the system; and
a backpressure device disposed between the tap and the dispensing nozzle, the backpressure device applying a backpressure on the beverage solution downstream of the sparger, the backpressure causing the nitrogen gas to remain in the beverage solution from the sparger to the backpressure device.

15. The system according to claim 14, wherein the backpressure device comprises a porous restrictor plate.

16. The system according to claim 15, wherein the tap comprises a diaphragm for controlling dispense of the beverage solution from the system via the dispensing nozzle, and wherein closing the tap causes the diaphragm to prevent dispensing of the beverage solution from the system via the dispensing nozzle, and wherein the porous restrictor plate is located downstream of the diaphragm.

17. The system according to claim 15, wherein the porous restrictor plate comprises a plurality of holes through which the beverage solution is conveyed, each hole in the plurality of holes having a diameter of 3/1000 inch to 75/1000 inch.

18. The system according to claim 14, wherein the sparger has a non-porous surface and a porous surface, wherein the porous surface is concentric with the flow channel and configured to inject the nitrogen gas into the liquid as the liquid flows across the porous surface.

19. The system according to claim 18, wherein the porous surface is spaced apart from an inner perimeter surface of the flow channel by 1/16 inch to 1/2 inch.

20. The system according to claim 18, wherein the porous surface is elongated such that the liquid tangentially flows across the porous surface as a laminar flow and the nitrogen gas is injected transversely into the liquid.

21. The system according to claim 14, wherein the liquid comprises a mixture of base liquid and concentrate liquid.

22. The system according to claim 21, wherein the liquid comprises coffee.

23. The system according to claim 21, further comprising a chiller configured to cool the base liquid prior to conveyance to the sparger.

\* \* \* \* \*